US011322773B2

(12) United States Patent
Azami

(10) Patent No.: US 11,322,773 B2
(45) Date of Patent: May 3, 2022

(54) LITHIUM SECONDARY BATTERY

(71) Applicant: NEC Corporation, Tokyo (JP)

(72) Inventor: Takeshi Azami, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/083,300

(22) PCT Filed: Mar. 9, 2017

(86) PCT No.: PCT/JP2017/009429
§ 371 (c)(1),
(2) Date: Sep. 7, 2018

(87) PCT Pub. No.: WO2017/155021
PCT Pub. Date: Sep. 14, 2017

(65) Prior Publication Data
US 2019/0097263 A1    Mar. 28, 2019

(30) Foreign Application Priority Data
Mar. 10, 2016    (JP) .............................. JP2016-047396

(51) Int. Cl.
H01M 10/0525 (2010.01)
H01M 4/587 (2010.01)
H01M 4/131 (2010.01)
H01M 4/36 (2006.01)
H01M 4/48 (2010.01)
(Continued)

(52) U.S. Cl.
CPC ....... *H01M 10/0525* (2013.01); *H01M 4/131* (2013.01); *H01M 4/133* (2013.01); *H01M 4/134* (2013.01); *H01M 4/364* (2013.01); *H01M 4/386* (2013.01); *H01M 4/483* (2013.01); *H01M 4/587* (2013.01); *H01M 10/0585* (2013.01); *H01M 2004/027* (2013.01); *H01M 2220/20* (2013.01); *Y02E 60/10* (2013.01); *Y02T 10/70* (2013.01)

(58) Field of Classification Search
CPC ......... H01M 10/0525; H01M 10/0585; H01M 4/133; H01M 4/386; H01M 4/587; H01M 2004/027; H01M 2220/20; Y02T 10/70; Y02E 60/10
See application file for complete search history.

(56) References Cited

U.S. PATENT DOCUMENTS

| 2002/0197201 A1* | 12/2002 | Fukuda | ................... C01B 32/20 423/448 |
| 2008/0067972 A1* | 3/2008 | Takami | ............... H01M 10/441 320/103 |
| 2015/0194668 A1* | 7/2015 | Ueda | ..................... H01M 4/587 429/231.4 |

FOREIGN PATENT DOCUMENTS

| CN | 1330419 A | 1/2002 |
| CN | 104904045 A | 9/2015 |

(Continued)

OTHER PUBLICATIONS

Machine translation of JP-2013200984-A, Asami et al. (Year: 2013).*

(Continued)

*Primary Examiner* — Mayla Gonzalez Ramos

(57) ABSTRACT

Provided is a lithium ion secondary battery that has excellent cycle characteristics and employs a silicon material for a negative electrode. This lithium ion secondary battery is characterized by having a negative electrode comprising a plate-like artificial graphite and a material comprising silicon as a constituent element, wherein at least some of particles of the plate-like artificial graphite are bent and have a crease on a plate face.

9 Claims, 2 Drawing Sheets

(51) Int. Cl.
    *H01M 4/134*    (2010.01)
    *H01M 4/133*    (2010.01)
    *H01M 4/38*    (2006.01)
    *H01M 10/0585*    (2010.01)
    *H01M 4/02*    (2006.01)

(56) References Cited

FOREIGN PATENT DOCUMENTS

| | | |
|---|---|---|
| JP | A-2002-367611 | 12/2002 |
| JP | 2009149831 A * | 7/2009 |
| JP | 2013200984 A * | 10/2013 |
| JP | A-2013-200983 | 10/2013 |
| JP | A-2013-200984 | 10/2013 |
| JP | A-2015-064936 | 4/2015 |
| JP | A-2015-088462 | 5/2015 |
| JP | A-2015-164127 | 9/2015 |
| WO | WO 2013/094037 A1 | 6/2013 |
| WO | WO 2014/046144 A1 | 3/2014 |

OTHER PUBLICATIONS

Machine translation of JP-2009149831-A, Yoshida, Yuka. (Year: 2009).*
International Search Report dated May 16, 2017, in corresponding PCT International Application.
Office Action, dated Sep. 17, 2020, issued by the Chinese Patent Office in counterpart Chinese Patent Application No. 201780015576.7.

* cited by examiner

LITHIUM SECONDARY BATTERY

CROSS-REFERENCE TO RELATED PATENT APPLICATIONS

This application is a National Stage Entry of International Application No. PCT/JP2017/009429, filed Mar. 9, 2017, which claims priority from Japanese Patent Application No. 2016-047396, filed Mar. 10, 2016. The entire contents of the above-referenced applications are expressly incorporated herein by reference.

TECHNICAL FIELD

The present invention relates to a secondary battery, a method for manufacturing the same and a vehicle using the same.

BACKGROUND ART

Lithium ion secondary batteries, which feature small size and large capacity, have been widely used as power supplies for electronic devices such as mobile phones and notebook computers and have contributed to enhancing convenience of mobile IT devices. In recent years, larger-scale applications, such as power supplies for driving motorcycles and automobiles and storage cells for smart grids, have attracted attention. As the demand for lithium ion secondary batteries has increased and they have been used in various fields, the batteries have been required to have characteristics, such as further higher energy density, lifetime characteristics that can withstand long-term use, and usability under a wide range of temperature conditions.

Although carbon-based materials are usually used in a negative electrode of the lithium ion secondary battery, in order to increase the energy density of the battery, using silicon materials, absorbing and desorbing a large amount of lithium ions per unit volume, in a negative electrode are studied. However, batteries using the silicon material have a problem with cycle characteristics, because the silicon material expands and contracts by repeating charge and discharge of lithium and thereby deteriorates.

Various proposals have been made to improve cycle characteristics of a lithium ion secondary battery using the silicon material in a negative electrode. Patent Document 1 discloses that the initial capacity, the initial efficiency and cycle characteristics of a battery can be improved by using plate like graphite having a thickness of 0.03 to 100 nm together with a silicon material as negative electrode active materials.

CITATION LIST

Patent Document

Patent Document 1: Japanese patent laid-open No. 2015-88462

SUMMARY OF INVENTION

Technical Problem

However, the battery of the prior art document still has the problem that its capacity decreases with charge and discharge cycles, and further improvement in cycle characteristics is necessary. The silicon materials, which have low conductivity, are generally used in combination with a conductive assisting agent, such as carbon black or the like. Degradation of the conductive assisting agent due to repeating charge and discharge cycles is also one of factors causing the deterioration of cycle characteristics of the lithium ion secondary battery using the silicon material. An object of the present invention is to provide a lithium ion secondary battery excellent in cycle characteristics despite using a negative electrode containing the silicon material.

Solution to Problem

The lithium ion secondary battery according to the present invention is characterized in comprising a negative electrode comprising a plate-like artificial graphite and a material comprising silicon as a constituent element, wherein at least some of particles of the plate-like artificial graphite are bent and have a crease on a plate face.

Advantageous Effect of Invention

According to the present invention, cycle characteristics of a lithium ion secondary battery using a material comprising silicon as a constituent element as a negative electrode active material can be improved.

DESCRIPTION OF EMBODIMENTS

Figure 1:
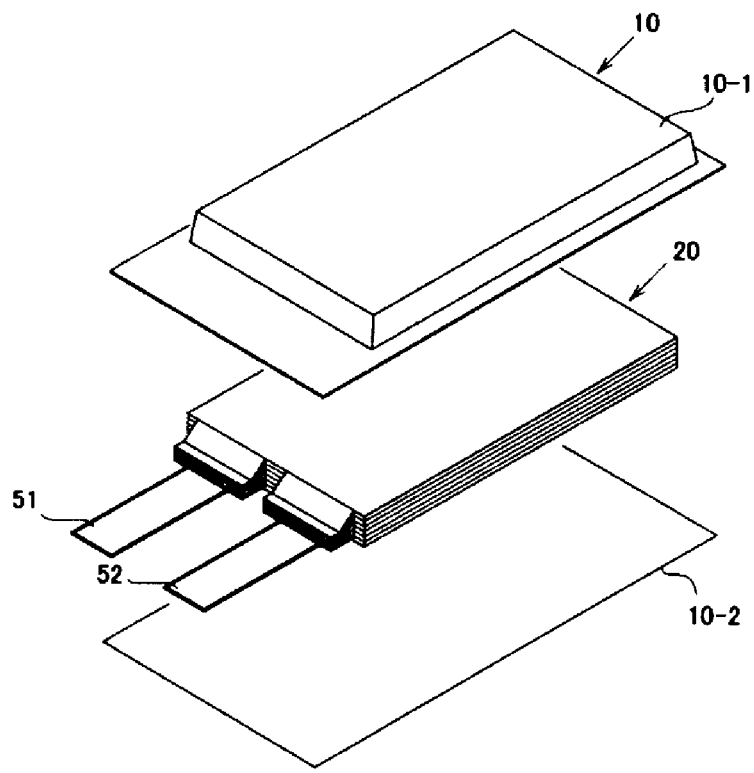
FIG. 1 is an exploded perspective view showing a basic structure of a film package battery.

Each constituent of the lithium ion secondary battery of the present invention will be described below.

<Negative Electrode>

The negative electrode comprises plate-like artificial graphite (hereinafter also referred to as the first artificial graphite) and a material comprising silicon as a constituent element (hereinafter also referred to as silicon material), wherein at least some of particles of the plate-like artificial graphite are bent and have a crease on a plate face. In addition, the negative electrode preferably comprises the second artificial graphite which has a different capacity from that of the first artificial graphite.

Artificial graphite is a material which is mainly made from raw materials such as coal coke, pitch, and heavy oil and which is graphitized at a relatively high temperature area such as 2200° C. to 3000° C. In raw materials, artificial graphite is definitely different from natural graphite, which is mainly made from natural minerals. From the viewpoint of safety in a lithium ion battery, it is desirable to contain less metal impurity. Since the artificial graphite is generally graphitized at the above-mentioned high temperature, it contains less impurity and has low resistance with respect to electron conductivity. Thus, the artificial graphite is suitable for a negative electrode material of the lithium ion battery.

The first artificial graphite has a plate-like shape. Plate-like graphite can be produced by grinding massive graphite with a grinding machine. Whether or not a negative electrode material has a plate-like shape can be determined by observing a face confirmable of the thickness of a primary particle of the negative electrode material with SEM (Scanning Electron Microscope) and measuring (thickness)/(long axis) that means the ratio of the thickness to the length in the long axis direction. Herein, the length in the long axis direction is the maximum length of the face. The thickness is the maximum length in the thickness direction. When a negative electrode material has a plate-like shape, the (thickness)/(long axis) thereof is 0.2 or less. When a negative electrode material has a plate-like shape, the lower limit of the (thickness)/(long axis) thereof is preferably 0.0001 or more, but not limited to these. The (thickness)/(long axis) of the first artificial graphite is preferably 0.05 or less. The (thickness)/(long axis) of the first artificial graphite is preferably 0.0005 or more.

The plate shape of the first artificial graphite is not particularly limited, but the (short axis*)/(long axis*), which means the ratio of the length in the short axis direction to the length in the long axis direction on a plate face in a SEM observation, is preferably 0.05 or more and 1 or less. Herein, the plate face is the largest face perpendicular to the thickness direction. The length in the long axis direction is the maximum length of the face. The length in the short axis direction is the maximum length in the direction perpendicular to the long axis direction.

Figure 3:
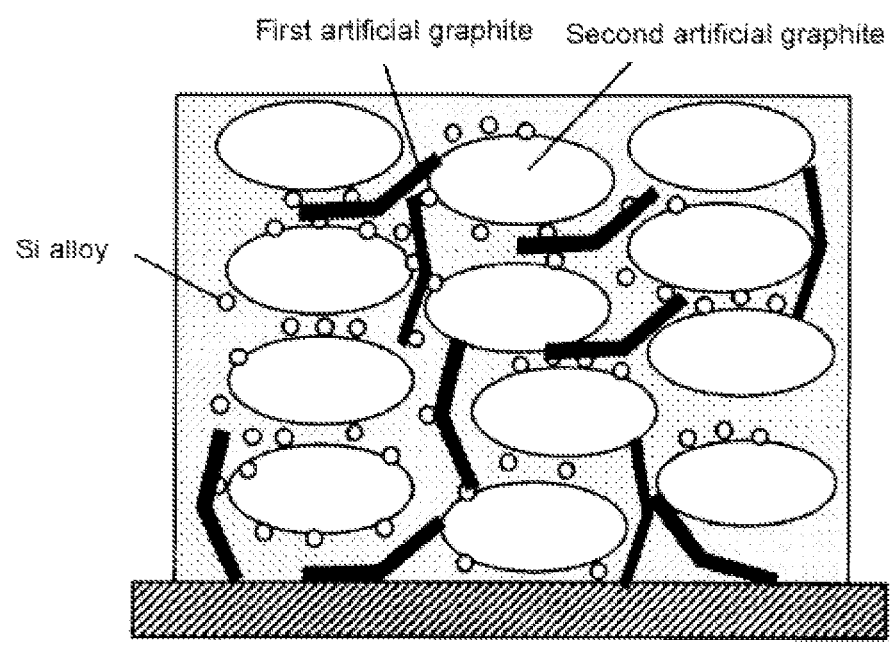
FIG. 3 is a schematic view showing a cross section of the negative electrode of the present invention using a silicon alloy as a silicon material.

At least some of particles of the first artificial graphite are bent and have a crease on a plate face. A plurality of the creases may be present, but only one is preferred. In particular, it is preferred that the crease connects two arbitrary points on the outline of the plate face. In this case, two plate faces separated by the crease form an angle to each other, for example, within the range of 110° or more and 170° or less. Such a bent shape further improves cycle characteristics of the battery. FIG. 3 shows a cross section perpendicular to a plate face of the first artificial graphite having bending, contained in a negative electrode active material layer. Such bent graphite can be obtained by preparing plate-like graphite having a desired size with a grinding machine and then treating this with a powder granulating apparatus at an appropriate rotating speed. In addition, such bent graphite is specifically described in documents such as JP2009-149831A1 and WO2002/059040. In the first artificial graphite, the content of the bent particles having a crease is preferably 30 weight % or more and more preferably 50 weight % or more, and may be 100 weight % based on the total amount of the first artificial graphite.

The capacity of the first artificial graphite is preferably more than 370 mAh/g, for example, within the range of 380 mAh/g to 450 mAh/g. Herein, the capacity value of each material means a charge capacity measured by the following method. The capacity measurement of each material is performed using a half-cell with metal Li for a counter electrode. The initial charge/discharge is started 24 hours after injection, in which a CCCV charge is conducted at 1/20 C (for 60 hours) and a CC discharge is conducted (0.02 to 1.0 V versus $Li/Li^+$). Note that a CCCV charge at 0.3 C (8 hours 20 minutes) and a CC discharge (0.02 to 1.0 V vs $Li/Li^+$) are conducted in cycle characteristics evaluation. When the second artificial graphite having a different capacity from that of the first artificial graphite is used as an optional negative electrode active material, it is preferred that the capacity of the second artificial graphite is lower than that of the first artificial graphite. Mixing two kinds of graphite having different capacities leads to smooth Li insertion/desorption during charging and makes it possible to form a thin low resistance SEI (Solid Electrolyte Interface) film.

The first artificial graphite is used as a conductive assisting agent. Therefore, it is preferred that the thickness and particle size thereof are adjusted so as to form conductive paths between active materials. The first artificial graphite preferably has a thickness of 0.5 μm or less. When the thickness is 0.5 μm or less, the first artificial graphite can enter into gaps between other carbon materials such as the second artificial graphite particles to form more conductive paths. In addition, the first artificial graphite in the gaps between the second artificial graphite particles can alleviate damage to the second artificial graphite due to the expansion of the silicon material. In order to obtain mechanical strength against pressing in an electrode fabrication process, the first artificial graphite preferably has a thickness of 0.05 μm or more. Herein, the thickness of a plate-like negative electrode material means an average thickness of 100 primary particles of a target negative electrode material, which can be determined by SEM observation.

The first artificial graphite is preferably sized so as not to fill the gap between active materials. Thereby, an electrolyte solution can flow onto the surfaces of an active material and a conductive assisting agent without depletion, and good quality SEI film can be formed and maintained. The good quality SEI film formed on an active material and a conductive assisting agent improves cycle characteristics. In this regard, artificial graphite is advantageous, because the artificial graphite has a large particle size compared with those of other conductive assisting agents, such as carbon black having a small particle size of the order of a few tens of nanometers. In addition, better quality SEI film can be formed on plate-like graphite than on conductive assisting agent having a low graphitization degree, such as carbon black. On the other hand, the first artificial graphite is preferably sized so as to enter into the gaps between other carbon materials such as the second artificial graphite. The first artificial graphite in the gaps between the second artificial graphite can form conductive paths between particles of the second artificial graphite and further can alleviate damage to the second artificial graphite due to the expansion of the silicon material. In view of these, the particle size distribution of the first artificial graphite preferably comprises a D10 of 1 μm or more and a D90 of 35 μm or less, and more preferably a D10 of 3 μm or more and a D90 of 20 μm or less. The D50 of the first artificial graphite is preferably 2 μm or more, more preferably 3 μm or more and 15 μm or less, and most preferably 7 μm or more and 11 μm or less. Herein, D10, D50 and D90 represent particle sizes in an integrated % based on volume. For example, D10 represents a particle size of 10%. The particle size distribution and the particle sizes such as D10, D50 and D90 can be measured by a laser diffraction type particle size distribution measuring apparatus.

In order to form conductive paths, it is preferred that the first artificial graphite is in contact with the silicon material. In one aspect of the present invention, a composite material of the first artificial graphite and the silicon material prepared in advance may be mixed with another active material such as the second artificial graphite to prepare a negative electrode active material layer.

The BET specific surface area of the first artificial graphite is preferably 5 $m^2/g$ or more and more preferably 7 $m^2/g$ or more to improve the conductivity of the negative electrode. When the specific surface area is large, it is generally required to increase the amount of a binder to maintain peel strength. This causes an increase in resistance. In order to avoid impairing the property of the silicon material that energy density is high, the BET specific surface area of the first artificial graphite is preferably 40 m²/g or less, more preferably 19 m²/g or less, and most preferably 11 m²/g or less.

The first artificial graphite has a relatively large surface area. For this reason, the content of the first artificial graphite is preferably 20 weight % or less and more preferably 10 weight % or less based on the total amount of the negative electrode active material so as to reduce the use amount of a binder. On the other hand, cycle characteristics tend to be improved as the content of the first artificial graphite is high. For this reason, the content of the first artificial graphite is preferably 0.5 weight % or more, more preferably 3 weight % or more, and most preferably 5 weight % or more based on the total amount of the negative electrode active material. Herein, the negative electrode active material is a material capable of intercalating and deintercalating lithium upon charge/discharge. Therefore, the artificial graphite used as a conductive assisting agent can be also considered as a negative electrode active material.

In the negative electrode, it is preferred to use the second artificial graphite having a different capacity from that of the first artificial graphite as a negative electrode active material. In this case, the capacity of the second artificial graphite is preferably lower than the capacity of the first artificial graphite. The capacity of the second artificial graphite is preferably 370 mAh/g or less, for example, within the range of 330 mAh/g to 370 mAh/g. Artificial graphite is less damaged by expansion of the silicon material compared with natural graphite. Therefore, by using artificial graphite as an active material, life characteristics of the battery can be improved. Examples of the shape of the second artificial graphite include a spherical shape, a massive shape, and a plate-like shape. Among these, a plate-like shape is preferred because cycle characteristics of the battery can be further improved. Plate-like graphite can improve cycle characteristics because its shape most easily follows the volume change when the active material comprising the silicon material expands and contracts.

The second artificial graphite is preferably sized so as to form gaps, into which the first artificial graphite can enter, between particles of the second artificial graphite. For this reason, the particle size of the second artificial graphite is important in some cases. The particle size distribution of the second artificial graphite preferably comprises a D10 of 1 μm or more and a D90 of 40 μm or less. The D50 of the second artificial graphite is preferably 2 μm or more and 20 μm or less, and more preferably 6 μm or more and 19 μm or less.

The BET specific surface area of the second artificial graphite is preferably 0.5 m²/g or more and more preferably 1 m²/g or more to obtain high ionic conduction between the electrolyte solution and the active material. The BET specific surface area of the second artificial graphite is preferably 9 m²/g or less and more preferably 6 m²/g or less so as to avoid using an excessive amount of a binder impairing the property of the silicon material that energy density is high.

The content of the second artificial graphite is preferably 90 weight % or less and more preferably 85 weight % or less based on the total amount of the negative electrode active material to increase the energy density of the battery. The content of the second artificial graphite is preferably 20 weight % or more and more preferably 60 weight % or more based on the total amount of the negative electrode active material to improve cycle characteristics of the battery.

Whether or not the second artificial graphite contains the bent particles is not particularly limited. The second artificial graphite may comprise the bent particles in the same manner as the first artificial graphite. In view of the content of the first artificial graphite in the negative electrode and the content of the bent particles in the first artificial graphite, the content of the artificial graphite particles which are bent and have a crease is preferably 3 weight % or more and more preferably 5 weight % or more based on the total amount of the artificial graphite contained in the negative electrode. The content of the artificial graphite particles which are bent and have a crease is preferably 50 weight % or less based on the total amount of the artificial graphite contained in the negative electrode.

In one embodiment, the content of the plate-like artificial graphite particles which are bent and have a crease is preferably 20 weight % or more and more preferably 40 weight % or more based on the total amount of the plate-like artificial graphite contained in the negative electrode. In one embodiment, the content of the plate-like artificial graphite particles, which are bent and have a crease, is preferably 70 weight % or less and more preferably 60 weight % or less based on the total amount of the plate-like artificial graphite contained in the negative electrode.

The content of the bent artificial graphite can be determined by SEM observation of a cross section of the negative electrode. For example, the negative electrode is treated with a cross section polisher to obtain SEM picture at a low accelerating voltage such as about 1 kV, and the weight ratio of the bent graphite can be estimated by assessing the presence or absence of a bend from the sectional shape of graphite contained in the negative electrode.

The negative electrode comprises the silicon material as an active material. Examples of the silicon material include metal silicon, alloys comprising silicon, silicon oxides represented by Composition formula $SiO_x$ (0<x≤2) and the like. Metals used in the alloy comprising silicon is preferably selected from the group consisting of Li, Al, Ti, Pb, Sn, In, Bi, Ag, Ba, Ca, Hg, Pd, Pt, Te, Zn and La. In order to increase the energy density of the battery, different kinds of the silicon materials such as a combination of a silicon alloy and a silicon oxide may be mixed and used. Composite particles in which the silicon material is coated with a carbon material may be used. In the present invention, it is preferred to use a silicon material coated with a carbon material in an amount of 1 weight % or less with respect to the silicon material.

Examples of the shape of the silicon material include, but not particularly limited to, a spherical shape, a massive shape, and a plate-like shape. Among these, a plate-like silicon material is preferred because clacking is less likely to occur even if charge/discharge cycles are repeated.

The particle size of the silicon material is also important in some cases. The particle size distribution of the silicon material preferably comprises a D10 of 0.1 μm or more and a D90 of 10 μm or less. The D50 of the silicon material is preferably 0.2 μm or more and 5 μm or less. Within these ranges, the damage to the second graphite due to the expansion of the silicon material can be suppressed.

The BET specific surface area of the silicon material is preferably 3 m²/g or more and more preferably 4 m²/g or more. The BET specific surface area of the silicon material is preferably 25 m²/g or less and more preferably 20 m²/g or less.

Among the silicon materials, silicon alloys and silicon oxides often have different BET surface areas. The particle size distribution of the silicon alloy preferably comprises a D10 of 0.1 μm or more and a D90 of 2 μm or less. In addition, the D50 of the silicon alloy is preferably 0.2 μm or more and 1 μm or less. The BET specific surface area of the silicon alloy is preferably 7 m²/g or more and more preferably 15 m²/g or more. The BET specific surface area of the silicon alloy is preferably 25 m²/g or less and more preferably 20 m²/g or less. The particle size distribution of the silicon oxide preferably comprises a D10 of 1.5 μm or more and a D90 of 10 μm or less. In addition, the D50 of the silicon oxide is preferably 3 μm or more and 5 μm or less. The BET specific surface area of the silicon oxide is preferably 3 m²/g or more and more preferably 4 m²/g or more. The BET specific surface area of the silicon oxide is preferably 7 m²/g or less and more preferably 5 m²/g or less.

The content of the silicon material is preferably 70 weight % or less and more preferably 40 weight % or less based on the total amount of the negative electrode active material in order to prevent cycle characteristics of the battery from being greatly deteriorated. The content of the silicon material is preferably 1 weight % or more and more preferably 5 weight % or more based on the total amount of the negative electrode active material in order to increase the energy density of the battery.

It is also important that particle sizes of the negative electrode materials are well-balanced so as to obtain the above mentioned effects such as forming the conductive paths, forming and maintaining the SEI film, and suppressing the damage due to the expansion and contraction of the active material. For this reason, it is preferred to set the particle size ratio of each negative electrode material and the first artificial graphite appropriately.

When the second artificial graphite is used, the 50% particle size of the first artificial graphite (D50A) and the 50% particle size of the second artificial graphite (D50G) preferably satisfy a relational equation of $0.1 \leq D50G/D50A \leq 2.0$, and more preferably a relational equation of $0.8 \leq D50G/D50A \leq 1.7$.

When a silicon alloy is used as the silicon material, the 50% particle size of the first artificial graphite (D50A) and the 50% particle size of the silicon alloy (D50Si) preferably satisfy a relational equation of $0.005 \leq D50Si/D50A \leq 0.15$, and more preferably a relational equation of $0.01 \leq D50Si/D50A \leq 0.1$.

When a silicon oxide is used as the silicon material, the 50% particle size of the first artificial graphite (D50A) and the 50% particle size of the silicon oxide (D50SiO) preferably satisfy a relational equation of $0.2 \leq D50SiO/D50A \leq 1$, and more preferably a relational equation of $0.4 \leq D50SiO/D50A \leq 0.7$.

Other active materials than the artificial graphite and the silicon material may be used. Examples of the additional active material include negative electrode active materials such as metals, metal oxides, and carbon.

Examples of the metal include Li, Al, Si, Pb, Sn, In, Bi, Ag, Ba, Ca, Hg, Pd, Pt, Te, Zn, La, an alloy of two or more thereof or the like. These metals and alloys may be used in combination of two or more. In addition, these metals and alloys may comprise one or more non-metal elements.

Examples of the metal oxide include aluminum oxide, tin oxide, indium oxide, zinc oxide, lithium oxide, a composite thereof or the like. In addition, one or two or more elements selected from nitrogen, boron and sulfur may also be added to the metal oxide in an amount of, for example, 0.1 to 5 weight %. Such addition can improve the electric conductivity of the metal oxide.

Examples of the carbon include natural graphite, amorphous carbon, graphene, diamond-like carbon, a carbon nanotube, a composite thereof or the like.

Within a range which does not impair the cycle characteristics and the energy density of the battery, a conductive assisting agent other than the plate-like artificial graphite may be further used. Examples of the additional conductive assisting agent include flake-like and fibrous carbon fine particles and the like, for example, carbon black, acetylene black, ketjen black, vapor grown carbon fibers and the like.

Examples of a negative electrode binder include polyvinylidene fluoride, vinylidene fluoride-hexafluoropropylene copolymer, vinylidene fluoride-tetrafluoroethylene copolymer, polytetrafluoroethylene, polyacrylic acid, polypropylene, polyethylene, polyimide, polyamideimide and the like. In addition to the above, styrene butadiene rubber (SBR) and the like can be used. When an aqueous binder such as an SBR emulsion is used, a thickener such as carboxymethyl cellulose (CMC) can also be used. The amount of the negative electrode binder is preferably 0.5 to 20 parts by weight based on 100 parts by weight of the negative electrode active material, from the viewpoint of the sufficient binding strength and the high energy density being in a trade-off relation with each other. The above-mentioned negative electrode binders may be mixed and used.

As a negative electrode current collector, from the viewpoint of electrochemical stability, aluminum, nickel, copper, silver, and alloys thereof are preferred. As the shape thereof, foil, flat plate, mesh and the like are exemplified.

The negative electrode may be prepared by forming a negative electrode active material layer comprising the negative electrode active material, the conductive assisting agent and the negative electrode binder. Examples of a method for forming the negative electrode active material layer include a doctor blade method, a die coater method, a CVD method, a sputtering method, and the like. It is also possible that after forming the negative electrode active material layer in advance, a thin film of aluminum, nickel or an alloy thereof may be formed by a method such as vapor deposition, sputtering or the like to obtain a negative electrode current collector.

<Positive Electrode>

The positive electrode active material is not particularly limited as long as it is a material capable of absorbing and desorbing lithium, and may be selected from some viewpoints. From the viewpoint of high energy density, it is preferable to contain a compound having high capacity. Examples of the high capacity compound include lithium nickel composite oxides in which a part of the Ni of lithium nickelate (LiNiO₂) is replaced by another metal element, and layered lithium nickel composite oxides represented by the following formula (A) are preferred.

$$Li_y Ni_{(1-x)} M_x O_2 \tag{A}$$

wherein $0 \leq x < 1$, $0 < y \leq 1.2$, and M is at least one element selected from the group consisting of Co, Al, Mn, Fe, Ti, and B.

It is preferred that the content of Ni is high, that is, x is less than 0.5, further preferably 0.4 or less in the formula (A). Examples of such compounds include $Li_\alpha Ni_\beta Co_\gamma Mn_\delta O_2$ ($0 < \alpha \leq 1.2$, preferably $1 \leq \alpha \leq 1.2$, $\beta + \gamma + \delta = 1$, $\beta \geq 0.7$, and $\gamma \leq 0.2$) and $Li_\alpha Ni_\beta Co_\gamma Al_\delta O_2$ ($0 < \alpha \leq 1.2$, preferably $1 \leq \alpha \leq 1.2$, $\beta + \gamma + \delta = 1$, $\beta \geq 0.6$, preferably $\beta \geq 0.7$, and $\gamma \leq 0.2$) and particularly include $LiNi_\beta Co_\gamma Mn_\delta O_2$ ($0.75 \leq \beta \leq 0.85$, $0.05 \leq \gamma \leq 0.15$, and $0.10 \leq \delta \leq 0.20$). More specifically, for example, $LiNi_{0.8}Co_{0.05}Mn_{0.15}O_2$, $LiNi_{0.8}Co_{0.1}Mn_{0.1}O_2$, $LiNi_{0.8}Co_{0.15}Al_{0.05}O_2$, and $LiNi_{0.8}Co_{0.1}Al_{0.1}O_2$ may be preferably used.

From the viewpoint of thermal stability, it is also preferred that the content of Ni does not exceed 0.5, that is, x is 0.5 or more in the formula (A). In addition, it is also preferred that particular transition metals do not exceed half.

Examples of such compounds include $Li_\alpha Ni_\beta Co_\gamma Mn_\delta O_2$ ($0<\alpha\leq1.2$, preferably $1\leq\alpha\leq1.2$, $\beta+\gamma+\delta=1$, $0.2\leq\beta\leq0.5$, $0.1\leq\gamma\leq0.4$, and $0.1\leq\delta\leq0.4$). More specific examples may include $LiNi_{0.4}Co_{0.3}Mn_{0.3}O_2$ (abbreviated as NCM433), $LiNi_{1/3}Co_{1/3}Mn_{1/3}O_2$, $LiNi_{0.5}Co_{0.2}Mn_{0.3}O_2$ (abbreviated as NCM523), and $LiNi_{0.5}Co_{0.3}Mn_{0.2}O_2$ (abbreviated as NCM532) (also including those in which the content of each transition metal fluctuates by about 10% in these compounds).

In addition, two or more compounds represented by the formula (A) may be mixed and used, and, for example, it is also preferred that NCM532 or NCM523 and NCM433 are mixed in the range of 9:1 to 1:9 (as a typical example, 2:1) and used. Further, by mixing a material in which the content of Ni is high (x is 0.4 or less in the formula (A)) and a material in which the content of Ni does not exceed 0.5 (x is 0.5 or more, for example, NCM433), a battery having high capacity and high thermal stability can also be formed.

Examples of the positive electrode active materials other than the above include lithium manganate having a layered structure or a spinel structure such as $LiMnO_2$, $Li_xMn_2O_4$ ($0<x<2$), $Li_2MnO_3$, and $Li_xMn_{1.5}Ni_{0.5}O_4$ ($0<x<2$); $LiCoO_2$ or materials in which a part of the transition metal in this material is replaced by other metal(s); materials in which Li is excessive as compared with the stoichiometric composition in these lithium transition metal oxides; materials having an olivine structure such as $LiFePO_4$, and the like. In addition, materials in which a part of elements in these metal oxides is substituted by Al, Fe, P, Ti, Si, Pb, Sn, In, Bi, Ag, Ba, Ca, Hg, Pd, Pt, Te, Zn, La or the like are also usable. The positive electrode active materials described above may be used alone or in combination of two or more.

Examples of a positive electrode binder include polyvinylidene fluoride, vinylidene fluoride-hexafluoropropylene copolymer, vinylidene fluoride-tetrafluoroethylene copolymer, polytetrafluoroethylene, polypropylene, polyethylene, polyimide, polyamideimide, polyacrylic acid and the like. In addition to the above, styrene butadiene rubber (SBR) and the like can be used. When an aqueous binder such as an SBR emulsion is used, a thickener such as carboxymethyl cellulose (CMC) can also be used. The above positive electrode binders may be mixed and used. The amount of the positive electrode binder is preferably 2 to 10 parts by weight based on 100 parts by weight of the positive electrode active material, from the viewpoint of the binding strength and energy density that are in a trade-off relation with each other.

For a coating layer containing the positive electrode active material, a conductive assisting agent may be added for the purpose of lowering the impedance. Examples of the conductive assisting agent include, flake-like, soot, and fibrous carbon fine particles and the like, for example, graphite, carbon black, acetylene black, vapor grown carbon fibers and the like.

As the positive electrode current collector, from the viewpoint of electrochemical stability, aluminum, nickel, copper, silver, and alloys thereof are preferred. As the shape thereof, foil, flat plate, mesh and the like are exemplified. In particular, a current collector using aluminum, aluminum alloy or iron-nickel-chromium-molybdenum based stainless steel is preferable.

The positive electrode may be prepared by forming a positive electrode active material layer comprising the positive electrode active material, the conductive assisting agent and the positive electrode binder. Examples of a method of forming the positive electrode active material layer include a doctor blade method, a die coater method, a CVD method, a sputtering method, and the like. It is also possible that after forming the positive electrode active material layer in advance, a thin film of aluminum, nickel or an alloy thereof may be formed by a method such as vapor deposition, sputtering or the like to obtain a positive electrode current collector.

<Electrolyte Solution>

The electrolyte solution of the secondary battery according to the present embodiment is not particularly limited, but is preferably a non-aqueous electrolyte solution containing a non-aqueous solvent and a supporting salt which are stable at an operating potential of the battery.

Examples of the non-aqueous solvent include aprotic organic solvents, for examples, cyclic carbonates such as propylene carbonate (PC), ethylene carbonate (EC) and butylene carbonate (BC); open-chain carbonates such as dimethyl carbonate (DMC), diethyl carbonate (DEC), ethyl methyl carbonate (EMC) and dipropyl carbonate (DPC); aliphatic carboxylic acid esters such as propylene carbonate derivatives, methyl formate, methyl acetate and ethyl propionate; ethers such as diethyl ether and ethyl propyl ether; phosphoric acid esters such as trimethyl phosphate, triethyl phosphate, tripropyl phosphate, trioctyl phosphate and triphenyl phosphate; and fluorinated aprotic organic solvents obtainable by substituting at least a part of hydrogen atoms of these compounds with fluorine atom(s), and the like.

Among them, cyclic or open-chain carbonate(s) such as ethylene carbonate (EC), propylene carbonate (PC), butylene carbonate (BC), dimethyl carbonate (DMC), diethyl carbonate (DEC), ethyl methyl carbonate (EMC), dipropyl carbonate (DPC) or the like is preferably contained.

The non-aqueous solvents may be used alone, or in combination of two or more.

Examples of the supporting salt include $LiPF_6$, $LiAsF_6$, $LiAlCl_4$, $LiClO_4$, $LiBF_4$, $LiSbF_6$, $LiCF_3SO_3$, $LiC_4F_9SO_3$, $LiC(CF_3SO_2)_3$, $LiN(CF_3SO_2)_2$ and the like. The supporting salts may be used alone or in combination of two or more. From the viewpoint of cost reduction, $LiPF_6$ is preferable.

The electrolyte solution may further contain additives. The additive is not particularly limited, and examples thereof include halogenated cyclic carbonates, carboxylic anhydrides, unsaturated cyclic carbonates, cyclic or open-chain disulfonic acid esters, and the like. These compounds can improve battery characteristics such as cycle characteristics. This is presumably because these additives decompose during charge/discharge of the secondary battery to form a film on the surface of an electrode active material to inhibit decomposition of an electrolyte solution and a supporting salt.

<Separator>

The separator may be of any type as long as it suppresses electron conduction between a positive electrode and a negative electrode, does not inhibit permeation of charged substances, and has durability against an electrolyte solution. Specific examples of a material used for such a separator include polyolefins such as polypropylene and polyethylene, cellulose, polyethylene terephthalate, polyimide, polyvinylidene fluoride, and aromatic polyamides (aramid) such as polymetaphenylene isophthalamide, polyparaphenylene terephthalamide and copolyparaphenylene 3,4'-oxydiphenylene terephthalamide, and the like. These can be used as porous films, woven fabrics, nonwoven fabrics or the like.

<Insulation Layer>

An insulation layer may be formed on a surface of at least one element selected from the positive electrode, the negative electrode and the separator. Examples of a method for forming the insulation layer include a doctor blade method, a die coater method, a CVD method, a sputtering method, and the like. The insulation layer may be formed at the same time as forming the positive electrode, negative electrode or separator. Materials constituting the insulation layer include a mixture of aluminum oxide, barium titanate or the like and SBR or PVDF.

<Structure of Secondary Battery>

Figure 2:
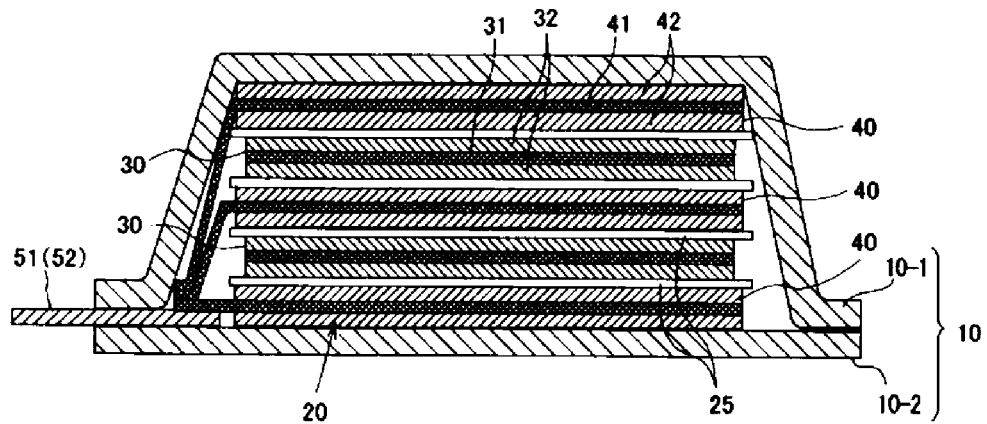
FIG. 2 is a cross-sectional view schematically showing a cross section of the battery of FIG. 1.

The secondary battery according to the present embodiment may be, for example, a secondary battery having a structure as shown in FIGS. 1 and 2. This secondary battery comprises a battery element 20, a film package 10 housing the battery element 20 together with an electrolyte, and a positive electrode tab 51 and a negative electrode tab 52 (hereinafter these are also simply referred to as "electrode tabs").

In the battery element 20, a plurality of positive electrodes 30 and a plurality of negative electrodes 40 are alternately stacked with separators 25 sandwiched therebetween as shown in FIG. 2. In the positive electrode 30, an electrode material 32 is applied to both surfaces of a metal foil 31, and also in the negative electrode 40, an electrode material 42 is applied to both surfaces of a metal foil 41 in the same manner. The present invention is not necessarily limited to stacking type batteries and may also be applied to batteries such as a winding type.

As shown in FIGS. 1 and 2, the secondary battery according to the present embodiment may have an arrangement in which the electrode tabs are drawn out to one side of the outer package, but the electrode tab may be drawn out to both sides of the outer package. Although detailed illustration is omitted, the metal foils of the positive electrodes and the negative electrodes each have an extended portion in part of the outer periphery. The extended portions of the negative electrode metal foils are brought together into one and connected to the negative electrode tab 52, and the extended portions of the positive electrode metal foils are brought together into one and connected to the positive electrode tab 51 (see FIG. 2). The portion in which the extended portions are brought together into one in the stacking direction in this manner is also referred to as a "current collecting portion" or the like.

The film package 10 is composed of two films 10-1 and 10-2 in this example. The films 10-1 and 10-2 are heat-sealed to each other in the peripheral portion of the battery element 20 and hermetically sealed. In FIG. 1, the positive electrode tab 51 and the negative electrode tab 52 are drawn out in the same direction from one short side of the film package 10 hermetically sealed in this manner.

Of course, the electrode tabs may be drawn out from different two sides respectively. In addition, regarding the arrangement of the films, in FIG. 1 and FIG. 2, an example in which a cup portion is formed in one film 10-1 and a cup portion is not formed in the other film 10-2 is shown, but other than this, an arrangement in which cup portions are formed in both films (not illustrated), an arrangement in which a cup portion is not formed in either film (not illustrated), and the like may also be adopted.

<Method for Manufacturing Secondary Battery>

The secondary battery according to the present embodiment can be manufactured by a conventional method. An example of a method for manufacturing a secondary battery will be described taking a stacked laminate type secondary battery as an example. First, in the dry air or an inert atmosphere, the positive electrode and the negative electrode are placed to oppose to each other via a separator to form an electrode element. Next, this electrode element is accommodated in an outer package (container), an electrolyte solution is injected, and the electrodes are impregnated with the electrolyte solution. Thereafter, the opening of the outer package is sealed to complete the secondary battery.

<Assembled Battery>

A plurality of the secondary batteries according to the present embodiment may be combined to form an assembled battery. The assembled battery may be configured by connecting two or more secondary batteries according to the present embodiment in series or in parallel or in combination of both. The connection in series and/or parallel makes it possible to adjust the capacitance and voltage freely. The number of the secondary batteries included in the assembled battery can be set appropriately according to the battery capacity and output.

<Vehicle>

The secondary battery or the assembled battery according to the present embodiment can be used in vehicles. Vehicles according to the present embodiment include hybrid vehicles, fuel cell vehicles, electric vehicles (besides four-wheel vehicles (cars, trucks, commercial vehicles such as buses, light automobiles, etc.) two-wheeled vehicle (bike) and tricycle), and the like. The vehicles according to the present embodiment is not limited to automobiles, it may be a variety of power source of other vehicles, such as a moving body like a train.

EXAMPLE

<Evaluation of Negative Electrode Material>

Examples 1 to 13

In Examples 1 to 13, graphite for a conductive assisting agent (Graphite conductive assisting agents A to F), graphite for an active material (Artificial graphite A to C) and silicon materials (Silicon alloys A to C and SiO A to C) were used as negative electrode materials. The particle sizes and BET specific surface areas of these negative electrode materials are shown in the following Tables 1 to 3.

TABLE 1

| | | Graphite conductive assisting agent | | | | | |
| | | A | B | C | D | E | F |
| --- | --- | --- | --- | --- | --- | --- | --- |
| D10 | μm | 1.2 | 1.6 | 1.7 | 2.8 | 3.7 | 5.2 |
| D50 | μm | 2.4 | 3.4 | 3.6 | 6.6 | 8.8 | 14.3 |
| D90 | μm | 4.7 | 6.0 | 6.8 | 12.8 | 17.9 | 30.5 |
| BET specific surface area | $m^2/g$ | 26.0 | 20.0 | 17.0 | 12.5 | 9.5 | 5.6 |

TABLE 2

| | | Artificial graphite | | |
| | | A | B | C |
| --- | --- | --- | --- | --- |
| D10 | μm | 5.1 | 6.2 | 7.5 |
| D50 | μm | 9.5 | 13.9 | 18.0 |
| D90 | μm | 25.8 | 30.1 | 35.0 |
| BET specific surface area | $m^2/g$ | 4.3 | 3.0 | 2.0 |

TABLE 3

|  |  | Silicon alloy | | | SiO | | |
| --- | --- | --- | --- | --- | --- | --- | --- |
|  |  | A | B | C | A | B | C |
| D10 | μm | 0.20 | 0.30 | 0.50 | 1.0 | 2.0 | 3.0 |
| D50 | μm | 0.30 | 0.55 | 1.50 | 2.5 | 4.8 | 6.5 |
| D90 | μm | 0.60 | 1.20 | 3.00 | 7.5 | 9.0 | 12.0 |
| BET specific surface area | $m^2/g$ | 18.10 | 12.90 | 6.30 | 8.2 | 4.5 | 3.9 |

Herein, Graphite conductive assisting agents A to F were plate-like artificial graphite, and 60 weight % of particles thereof have a bent shape with an internal angle of 110° to 170° and have a crease on the plate face. Artificial graphite A and B had a plate-like shape, and Artificial graphite C had a massive shape. As a result of measuring the capacity of the graphite, Graphite conductive assisting agents A to F had a capacity of 400 mAh/g, and Artificial graphite A to C had a capacity of 365 mAh/g.

In each example, the negative electrode materials were selected as described in Tables 4 to 6. In each example, the content ratio of the materials in a negative electrode active material layer was adjusted such that the amount of Graphite conductive assisting agents A to F was 8 weight %, the amount of Artificial graphite A to C was 80 weight %, the amount of Silicon alloys A to C or SiO A to C was 8 weight %, and the amount of a polyacrylic acid binder was 4 weight %. This negative electrode active material layer was formed on a current collector to produce a negative electrode. The electrode density of the negative electrode was 1.45 to 1.55 g/cc.

$LiNi_{0.8}Co_{0.15}Al_{0.05}O_2$ was used as a positive electrode material. An positive electrode active material layer was formed on a current collector to produce a positive electrode.

$LiPF_6$ was added to an electrolyte solvent containing ethylene carbonate (EC), diethyl carbonate (DEC), ethyl methyl carbonate (EMC) at a volume ratio of EC/DEC/EMC=3/6/1 such that the concentration of $LiPF_6$ was 0.9 mol/L. An electrolyte solution was finished by further adding fluoroethylene carbonate such that the concentration thereof in the electrolyte solution was 10 weight %.

The produced positive electrode and negative electrode were placed in a laminate package so as to oppose to each other via a separator, and the electrolyte solution was injected there. The initial charge and discharge was started 24 hours after the injection, in which a CCCV charge was conducted (at 1/20 C, for 60 hours) and a CC discharge was conducted (at 0.02 to 1.0 V versus $Li/Li^+$). To evaluate cycle characteristics, a CCCV charge (at 0.3 C, for 8 hours 20 minutes) and a CC discharge (0.02 to 1.0 V versus $Li/Li^+$) were conducted 30 times at 25° C. The ratio of the capacity at the 30th cycle to the capacity at the 1st cycle was measured as a capacity retention rate. The results are shown in Tables 4 to 6.

TABLE 4

|  | Graphite for active material | Silicon material | Graphite for conductive assisting agent | Capacity retention rate (%) |
| --- | --- | --- | --- | --- |
| Example 1 | Artificial graphite A | Silicon alloy B | Graphite conductive assisting agent A | 83 |
| Example 2 | Artificial graphite A | Silicon alloy B | Graphite conductive assisting agent B | 85 |
| Example 3 | Artificial graphite A | Silicon alloy B | Graphite conductive assisting agent C | 88 |
| Example 4 | Artificial graphite A | Silicon alloy B | Graphite conductive assisting agent D | 90 |
| Example 5 | Artificial graphite A | Silicon alloy B | Graphite conductive assisting agent E | 95 |
| Example 6 | Artificial graphite A | Silicon alloy B | Graphite conductive assisting agent F | 93 |

TABLE 5

|  | Graphite for active material | Silicon material | Graphite for conductive assisting agent | Capacity retention rate (%) |
| --- | --- | --- | --- | --- |
| Example 5 | Artificial graphite A | Silicon alloy B | Graphite conductive assisting agent E | 95 |
| Example 7 | Artificial graphite B | Silicon alloy B | Graphite conductive assisting agent E | 96 |
| Example 8 | Artificial graphite C | Silicon alloy B | Graphite conductive assisting agent E | 97 |

TABLE 6

|  | Graphite for active material | Silicon material | Graphite for conductive assisting agent | Capacity retention rate (%) |
| --- | --- | --- | --- | --- |
| Example 9 | Artificial graphite A | Silicon alloy A | Graphite conductive assisting agent E | 98 |
| Example 5 | Artificial graphite A | Silicon alloy B | Graphite conductive assisting agent E | 95 |
| Example 10 | Artificial graphite A | Silicon alloy C | Graphite conductive assisting agent E | 93 |
| Example 11 | Artificial graphite A | SiO A | Graphite conductive assisting agent E | 94 |
| Example 12 | Artificial graphite A | SiO B | Graphite conductive assisting agent E | 99 |
| Example 13 | Artificial graphite A | SiO C | Graphite conductive assisting agent E | 95 |

Comparative Examples 1 and 2

Carbon black was used as a conductive assisting agent instead of the graphite for a conductive assisting agent. Carbon black A had a primary particle diameter of 40 to 50 nm and a specific surface area of 65 $m^2/g$, and Carbon black B had a primary particle diameter of 50 to 60 nm and a specific surface area of 45 $m^2/g$. Secondary batteries were produced, using a negative electrode in which its negative electrode active material layer comprises 80 weight % of Artificial graphite A, 8 weight % of Silicon alloy B, 8 weight % of Carbon black A or B and 4 weight % of a polyacrylic acid binder. The other constituents than the negative electrode materials were the same as in Examples 1 to 13. The capacity retention rates of the fabricated secondary batteries at the 30th cycle were measured. The results are shown in the following table.

TABLE 7

|  | Graphite for active material | Silicon material | Conductive assisting agent | Capacity retention rate (%) |
| --- | --- | --- | --- | --- |
| Comparative example 1 | Artificial graphite A | Silicon alloy B | Carbon black A | 80 |

TABLE 7-continued

|  | Graphite for active material | Silicon material | Conductive assisting agent | Capacity retention rate (%) |
|---|---|---|---|---|
| Comparative example 2 | Artificial graphite A | Silicon alloy B | Carbon black B | 82 |

Comparative Example 3

Graphite conductive assisting agent G was used as graphite for conductive assisting agent, which is the same as Graphite conductive assisting agent B except that the particles were not bent. A secondary battery was produced, using a negative electrode in which its negative electrode active material layer comprises 80 weight % of Artificial graphite A, 8 weight % of Silicon alloy B, 8 weight % of Graphite conductive assisting agent G and 4 weight % of a polyacrylic acid binder. The other constituents than the negative electrode materials were the same as in Examples 1 to 13. The capacity retention rates of the fabricated secondary batteries at the 30$^{th}$ cycle were measured. The result is shown in the following table.

TABLE 8

|  | Graphite for active material | Silicon material | Graphite for conductive assisting agent | Capacity retention rate (%) |
|---|---|---|---|---|
| Comparative example 3 | Artificial graphite A | Silicon alloy B | Graphite conductive assisting agent G | 77 |

Comparative Examples 4 to 6

Natural graphite was used as graphite for an active material. The particle sizes and BET specific surface areas of Natural graphite A to C are shown in the following table. Natural graphite A to C had a spherical shape and had a content of 365 mAh/g.

TABLE 9

|  |  | Natural graphite | | |
|---|---|---|---|---|
|  |  | A | B | C |
| D10 | μm | 11.5 | 14.1 | 18.3 |
| D50 | μm | 18.2 | 22.3 | 26.7 |
| D90 | μm | 27.2 | 30.7 | 36.5 |
| BET specific surface area | m$^2$/g | 4.0 | 2.0 | 1.5 |

Secondary batteries were produced, using a negative electrode in which its negative electrode active material layer comprises 80 weight % of Natural graphite A to C, 8 weight % of Silicon alloy B, 8 weight % of Graphite conductive assisting agent E and 4 weight % of a polyacrylic acid binder. The other constituents than the negative electrode materials were the same as in Examples 1 to 13. The capacity retention rates of the fabricated secondary batteries at the 30$^{th}$ cycle were measured. The results are shown in the following table.

TABLE 10

|  | Graphite for active material | Silicon material | Graphite for conductive assisting agent | Capacity retention rate (%) |
|---|---|---|---|---|
| Comparative example 4 | Natural graphite A | Silicon alloy B | Graphite conductive assisting agent E | 78 |
| Comparative example 5 | Natural graphite B | Silicon alloy B | Graphite conductive assisting agent E | 79 |
| Comparative example 6 | Natural graphite C | Silicon alloy B | Graphite conductive assisting agent E | 80 |

<Evaluation of Particle Size Ratio>

In order to confirm the relationship between the particle size of the graphite for a conductive assisting agent and the particle size of the graphite for an active material, all the combinations of Graphite conductive assisting agents A to F and Artificial graphite A to C were evaluated for the capacity retention rate in the same manner as in Example 1, using Silicon alloy B as the silicon material. The ratios of the 50% particle size D50 of Artificial graphite A to C to the 50% particle size D50 of Graphite conductive assisting agents A to F and the capacity retention rates at the 30th cycle are shown in the following Tables.

TABLE 11-1

| D50 ratio (Artificial graphite D50/Graphite conductive assisting agent D50) | | | |
|---|---|---|---|
|  | Artificial graphite A | Artificial graphite B | Artificial graphite C |
| Graphite conductive assisting agent A | 3.96 | 5.79 | 7.50 |
| Graphite conductive assisting agent B | 2.79 | 4.09 | 5.29 |
| Graphite conductive assisting agent C | 2.64 | 3.86 | 5.00 |
| Graphite conductive assisting agent D | 1.44 | 2.11 | 2.73 |
| Graphite conductive assisting agent E | 1.08 | 1.58 | 2.05 |
| Graphite conductive assisting agent F | 0.66 | 0.97 | 1.26 |

TABLE 11-2

| Capacity retention rate at the 30$^{th}$ cycle (%) | | | |
|---|---|---|---|
|  | Artificial graphite A | Artificial graphite B | Artificial graphite C |
| Graphite conductive assisting agent A | 83 | 76 | 77 |
| Graphite conductive assisting agent B | 85 | 86 | 87 |
| Graphite conductive assisting agent C | 88 | 89 | 90 |
| Graphite conductive assisting agent D | 90 | 91 | 92 |
| Graphite conductive assisting agent E | 95 | 96 | 97 |
| Graphite conductive assisting agent F | 93 | 94 | 95 |

In order to confirm the relationship between the particle size of the graphite for a conductive assisting agent and the particle size of the silicon alloy, all the combinations of Graphite conductive assisting agents A to F and Silicon alloys A to C were evaluated for the capacity retention rates in the same manner as in Example 1, using Artificial graphite A as the graphite for an active material. The ratios of the 50% particle size D50 of Silicon alloys A to C to the 50% particle size D50 of Graphite conductive assisting agents A to F and the capacity retention rates at the 30$^{th}$ cycle are shown in the following Tables.

TABLE 12-1

D50 ratio (Silicon alloy D50/Graphite conductive assisting agent D50)

|  | Silicon alloy A | Silicon alloy B | Silicon alloy C |
|---|---|---|---|
| Graphite conductive assisting agent A | 0.13 | 0.23 | 0.63 |
| Graphite conductive assisting agent B | 0.09 | 0.16 | 0.44 |
| Graphite conductive assisting agent C | 0.08 | 0.15 | 0.42 |
| Graphite conductive assisting agent D | 0.05 | 0.08 | 0.23 |
| Graphite conductive assisting agent E | 0.03 | 0.06 | 0.17 |
| Graphite conductive assisting agent F | 0.02 | 0.04 | 0.10 |

TABLE 12-2

Capacity retention rate at the 30$^{th}$ cycle (%)

|  | Silicon alloy A | Silicon alloy B | Silicon alloy C |
|---|---|---|---|
| Graphite conductive assisting agent A | 78 | 83 | 72 |
| Graphite conductive assisting agent B | 88 | 85 | 83 |
| Graphite conductive assisting agent C | 91 | 88 | 86 |
| Graphite conductive assisting agent D | 33 | 90 | 88 |
| Graphite conductive assisting agent E | 98 | 95 | 93 |
| Graphite conductive assisting agent F | 96 | 93 | 91 |

In order to confirm the relationship between the particle size of the graphite for a conductive assisting agent and the particle size of the SiO, all the combinations of Graphite conductive assisting agents A to F and SiO A to C were evaluated for the capacity retention rate in the same manner as in Example 1, using Artificial graphite A as the graphite for an active material. The ratios of the 50% particle size D50 of SiO A to C to the 50% particle size D50 of Graphite conductive assisting agents A to F and the capacity retention rates at the 30$^{th}$ cycle are shown in the following Tables.

TABLE 13-1

D50 ratio (SiO D50/Graphite conductive assisting agent D50)

|  | SiO A | SiO B | SiO C |
|---|---|---|---|
| Graphite conductive assisting agent A | 1.04 | 2.00 | 2.71 |
| Graphite conductive assisting agent B | 0.74 | 1.41 | 1.91 |
| Graphite conductive assisting agent C | 0.69 | 1.33 | 1.81 |
| Graphite conductive assisting agent D | 0.38 | 0.73 | 0.98 |
| Graphite conductive assisting agent E | 0.17 | 0.55 | 0.74 |
| Graphite conductive assisting agent F | 0.08 | 0.34 | 0.45 |

TABLE 13-2

Capacity retention rate at the 30$^{th}$ cycle (%)

|  | SiO A | SiO B | SiO C |
|---|---|---|---|
| Graphite conductive assisting agent A | 73 | 78 | 74 |
| Graphite conductive assisting agent B | 84 | 89 | 85 |
| Graphite conductive assisting agent C | 87 | 92 | 88 |
| Graphite conductive assisting agent D | 89 | 94 | 90 |
| Graphite conductive assisting agent E | 94 | 99 | 95 |
| Graphite conductive assisting agent F | 92 | 97 | 93 |

The whole or part of the exemplary embodiments disclosed above can be described as, but not limited to, the following supplementary notes.

(Supplementary Note 1)

A lithium ion secondary battery comprising a negative electrode comprising a plate-like artificial graphite and a material comprising silicon as a constituent element, wherein at least some of particles of the plate-like artificial graphite are bent and have a crease on a plate face.

(Supplementary Note 2)

The lithium ion secondary battery according to Supplementary note 2, wherein a content of the bent artificial graphite is 3 weight % or more of a total amount of an artificial graphite contained in the negative electrode.

(Supplementary Note 3)

The lithium ion secondary battery according to Supplementary note 1 or 2, wherein the crease connects two points on an outline of the plate face, and the plate face forms an angle within a range of 110° or more and 170° or less via the crease.

(Supplementary Note 4)

The lithium ion secondary battery according to any one of Supplementary notes 1 to 3, wherein the material comprising silicon as a constituent element is selected from the group consisting of silicon oxides, silicon alloys and combinations thereof.

(Supplementary Note 5)

The lithium ion secondary battery according to any one of Supplementary notes 1 to 4, wherein the negative electrode comprises a first artificial graphite and a second artificial graphite having different capacities.

(Supplementary Note 6)

The lithium ion secondary battery according to Supplementary note 5, wherein the first artificial graphite has a plate-like shape, and 30 weight % or more of the first artificial graphite is bent and have a crease on a plate face.

(Supplementary Note 7)

The lithium ion secondary battery according to Supplementary note 5 or 6, wherein the first artificial graphite has a 50% particle size of 7 μm or more and 11 μm or less.

(Supplementary Note 8)

The lithium ion secondary battery according to any one of Supplementary notes 5 to 7, wherein the first artificial graphite has a BET specific surface area of 5 m$^2$/g or more and 40 m$^2$/g or less.

(Supplementary Note 9)

The lithium ion secondary battery according to any one of Supplementary notes 5 to 8, wherein the second artificial graphite has a plate-like shape.

(Supplementary Note 10)

The lithium ion secondary battery according to any one of Supplementary notes 5 to 9, wherein D50A that represents a 50% particle size of the first artificial graphite and D50G that represents a 50% particle size of the second artificial graphite satisfy a relational equation: $0.1 \leq D50G/D50A \leq 2.0$.

(Supplementary Note 11)

The lithium ion secondary battery according to any one of Supplementary notes 5 to 10, wherein the second artificial graphite has a BET specific surface area of 0.5 m²/g or more and 9 m²/g or less.

(Supplementary Note 12)

A vehicle equipped with the secondary battery according to any one of Supplementary notes 1 to 11.

(Supplementary Note 13)

A method for manufacturing a lithium ion secondary battery, comprising the steps of:

fabricating an electrode element by stacking a negative electrode and a positive electrode via a separator, and encapsulating the electrode element and an electrolyte solution into an outer package, wherein the negative electrode comprises a plate-like artificial graphite and a material comprising silicon as a constituent element, and at least some of particles of the plate-like artificial graphite are bent and have a crease on a plate face.

This application claims priority right based on Japanese patent application No. 2016-47396, filed on Mar. 10, 2016, the entire disclosure of which is hereby incorporated by reference.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

INDUSTRIAL APPLICABILITY

The secondary battery according to the present invention can be utilized in, for example, all the industrial fields requiring a power supply and the industrial fields pertaining to the transportation, storage and supply of electric energy. Specifically, it can be used in, for example, power supplies for mobile equipment such as cellular phones and notebook personal computers; power supplies for electrically driven vehicles including an electric vehicle, a hybrid vehicle, an electric motorbike and an electric-assisted bike, and moving/transporting media such as trains, satellites and submarines; backup power supplies for UPSs; and electricity storage facilities for storing electric power generated by photovoltaic power generation, wind power generation and the like.

EXPLANATION OF REFERENCE 10 film package
20 battery element
25 separator
30 positive electrode
40 negative electrode

The invention claimed is:

1. A lithium ion secondary battery comprising a negative electrode, the negative electrode comprising:

a plurality of first artificial graphite particles having a plate-like shape;

a plurality of second artificial graphite particles having a plate-like shape and having capacities different from the plurality of first artificial graphite particles; and a material comprising silicon as a constituent element, wherein 30 weight % or more of the plurality of first artificial graphite particles are bent and have only one crease on a plate face, further wherein the crease connects two points on an outline of the plate face, and the plate face forms an angle within a range of 110° or more and 170° or less via the crease.

2. The lithium ion secondary battery according to claim 1, wherein a content of the bent artificial graphite particle is 3 weight % or more of a total amount of the plurality of first artificial graphite particles and the plurality of second artificial graphite particles contained in the negative electrode.

3. The lithium ion secondary battery according to claim 1, wherein the material comprising silicon as a constituent element is selected from the group consisting of silicon oxides, silicon alloys and combinations thereof.

4. The lithium ion secondary battery according to claim 1, wherein the plurality of first artificial graphite particles has a 50% particle size of 7 µm or more and 11 µm or less.

5. The lithium ion secondary battery according to claim 1, wherein the plurality of first artificial graphite particles has a BET specific surface area of 5 m²/g or more and 40 m²/g or less.

6. The lithium ion secondary battery according to claim 1, wherein D50A that represents a 50% particle size of the plurality of first artificial graphite particles and D50G that represents a 50% particle size of the plurality of second artificial graphite particles satisfy a relational equation: $0.1 \leq D50G/D50A \leq 2.0$.

7. The lithium ion secondary battery according to claim 1, wherein the plurality of second artificial graphite particles has a BET specific surface area of 0.5 m²/g or more and 9 m²/g or less.

8. A vehicle equipped with the secondary battery according to claim 1.

9. A method for manufacturing a lithium ion secondary battery, comprising the steps of:

fabricating an electrode element by stacking a negative electrode and a positive electrode via a separator, and encapsulating the electrode element and an electrolyte solution into an outer package, wherein the negative electrode comprises:

a plurality of first artificial graphite particles having a plate-like shape, a plurality of second artificial graphite particles having a plate-like shape and having capacities different from the plurality of first artificial graphite particles; and a material comprising silicon as a constituent element, wherein 30 weight % or more of the plurality, of first artificial graphite particles are bent and have only one crease on a plate face, further wherein the crease connects two points on an outline of the plate face, and the plate face forms an angle within a range of 110° or more and 170° or less via the crease.

* * * * *